(12) United States Patent
Sze et al.

(10) Patent No.: US 10,742,762 B2
(45) Date of Patent: Aug. 11, 2020

(54) REDUCING REDIRECTS

(71) Applicant: Google LLC, Mountain View, CA (US)

(72) Inventors: Shing Franky Sze, Hoboken, NJ (US);
Michael Kleber, Newton, MA (US);
Mathieu Gagne, Somerville, MA (US);
Leonidas Kontothanassis, Lexington, MA (US)

(73) Assignee: Google LLC, Mountain View, CA (US)

( * ) Notice: Subject to any disclaimer, the term of this patent is extended or adjusted under 35 U.S.C. 154(b) by 464 days.

(21) Appl. No.: 15/010,106

(22) Filed: Jan. 29, 2016

(65) Prior Publication Data

US 2016/0150044 A1    May 26, 2016

Related U.S. Application Data

(63) Continuation of application No. 13/153,720, filed on Jun. 6, 2011, now Pat. No. 9,282,158.

(51) Int. Cl.
*H04L 29/08*    (2006.01)
*G06Q 30/02*    (2012.01)

(52) U.S. Cl.
CPC ..... *H04L 67/2814* (2013.01); *G06Q 30/0241* (2013.01); *G06Q 30/0242* (2013.01); *H04L 67/02* (2013.01); *H04L 67/22* (2013.01)

(58) Field of Classification Search
CPC .. G06Q 30/241; G06Q 30/255; G06Q 30/256; G06Q 30/0241; G06Q 30/0255;
(Continued)

(56) References Cited

U.S. PATENT DOCUMENTS 6,553,376 B1    4/2003 Lewis et al.
8,719,101 B1 *  5/2014 Booth ................ G06Q 30/0277
                                              705/14.73
(Continued)

FOREIGN PATENT DOCUMENTS

CN    1777880    5/2006
CN    101119223  2/2008
(Continued)

OTHER PUBLICATIONS

Notification of Transmittal of the International Search Report and the Written Opinion of the International Searching Authority for PCT/US2010/040902 dated Feb. 28, 2013, 9 pages.
(Continued)

*Primary Examiner* — Chris Parry
*Assistant Examiner* — Adam A Cooney
(74) *Attorney, Agent, or Firm* — Fish & Richardson P.C.

(57) ABSTRACT

Methods, systems, and apparatus, including computer programs encoded on a computer storage medium, for reducing redirects. In one aspect, a method includes receiving request data indicating that a user device has requested a content item. The request data specifies other data processing apparatus to which user interactions with the content item are to be reported. The content item includes a reference to a resource that is requested in response to user interaction with the content item. Response data is provided. The response data includes data that cause presentation of the content item. Interaction data is received specifying user interaction with the content item occurred. Redirect data is provided that cause the user device to be redirected to the resource. Reporting data is provided to the other data processing apparatus, specifying user interaction with the content item occurred. The reporting data is provided asynchronously relative to the redirect data.

17 Claims, 7 Drawing Sheets

(58) Field of Classification Search
CPC .. G06Q 30/0256; H04L 67/28; H04L 67/2804; H04L 67/2809; H04L 67/2814
USPC ............................................. 709/202
See application file for complete search history.

(56) References Cited

U.S. PATENT DOCUMENTS

| | | |
|---|---|---|
| 2006/0015574 A1 | 1/2006 | Seed et al. |
| 2006/0149677 A1* | 7/2006 | Shahine ............... G06Q 30/02 |
| | | 705/50 |
| 2008/0119167 A1 | 5/2008 | Rao |
| 2008/0172488 A1 | 7/2008 | Jawahar et al. |
| 2008/0313010 A1 | 12/2008 | Jepson et al. |
| 2010/0083132 A1 | 4/2010 | Ulrich et al. |
| 2010/0145796 A1 | 6/2010 | Berry et al. |
| 2010/0211457 A1* | 8/2010 | Martin-Cocher ...... G06Q 30/02 |
| | | 705/14.45 |
| 2010/0306048 A1 | 12/2010 | Corduneanu |
| 2011/0055552 A1* | 3/2011 | Francis ............... H04L 63/0421 |
| | | 713/153 |

FOREIGN PATENT DOCUMENTS

| | | |
|---|---|---|
| CN | 101330741 | 12/2008 |
| JP | 2008-225758 | 9/2008 |
| JP | 2008-226260 | 9/2008 |
| JP | 2009-99075 | 5/2009 |
| JP | 2010-186459 | 8/2010 |
| KR | 100845145 | 7/2008 |
| KR | 102011057854 | 6/2011 |
| WO | 98/58334 | 12/1998 |
| WO | 2009/052531 | 4/2009 |

OTHER PUBLICATIONS

Extended European Search Report issued in European Application No. 12796537.4 dated Jan. 8, 2015, 8 pages.
Office Action issued in Chinese Application No. 201280035960.0 dated Oct. 9, 2015, 31 pages (with English translation).
Office Action issued in Chinese Application No. 201280035960.0 dated Jun. 23, 2016, 18 pages (with English translation).
Notice of Allowance issued in Japanese Application No. 2016-123435, dated Sep. 25, 2017, 3 pages (English translation).
Office Action issued in Japanese Application No. 2016-123435 dated Jul. 24, 2017, 3 pages (English Translation).
Extended European Search Report issued in European Application No. 18165541.6, dated Jun. 6, 2018, 7 pages.
CN Office Action and Search Report in Chinese Application No. 201710067986.8, dated Aug. 5, 2019, 16 pages (with English translation).
CN Office Action in Chinese Application No. 201710067986.8, dated Jan. 9, 2020, 7 pages (with English translation).
EP Office Action in European Application No. 18165541.6, dated Sep. 24, 2018, 2 pages (with English translation).
JP Office Action in Japanese Application No. 2014-514552 dated May 16, 2016, 5 pages (with English translation).

* cited by examiner

REDUCING REDIRECTS

CROSS-REFERENCE TO RELATED APPLICATIONS

This application is a continuation application of, and claims priority to, U.S. patent application Ser. No. 13/153,720, titled "Reducing Redirects," filed on Jun. 6, 2011. The disclosure of the foregoing application is incorporated herein by reference in its entirety for all purposes.

BACKGROUND

This specification relates to data processing.

The Internet provides access to a wide variety of resources. For example, video and/or audio files, as well as web pages for particular subjects or particular news articles are accessible over the Internet. Access to these resources presents opportunities for advertisements to be provided with the resources. For example, a web page can include advertisement slots in which advertisements can be presented. These advertisements slots can be defined in the web page or defined for presentation with a web page, for example, in a pop-up window.

When a web page (or another resource) is requested by a user, an advertisement request is generated and transmitted to an advertisement management system that selects advertisements for presentation in the advertisement slots. The advertisement management system selects advertisements, for example, based on characteristics of the web page with which the advertisements will be presented, demographic information about the user to whom the advertisements will be presented, and/or other information about the environment in which the advertisement will be presented.

Advertisements that are presented in the advertisement slots can include a portion of code that, in response to user interaction with the advertisement, causes a user device to request presentation of a specified resource (e.g., a web page for the advertiser). In order to track the user interactions with the advertisement, the request for the specified resource may be redirected through one or more servers ("intermediary servers") prior to being received by a server that provides the specified resource in response to the request ("destination server"). Each redirect that is performed increases the time from when the user takes action to access the specified resource until the specified resource is received by the user device, and increases the likelihood of an error occurring that prevents the specified resource from being provided to the user device.

SUMMARY

In general, one innovative aspect of the subject matter described in this specification can be embodied in methods that include the actions of receiving request data indicating that a user device has requested a content item, the request data specifying one or more other data processing apparatus to which user interactions with the content item are to be reported, the content item including a reference to a resource that is requested in response to user interaction with the content item; providing response data in response to the request data, the response data including data that cause presentation of the content item; receiving interaction data specifying that user interaction with the content item occurred; providing redirect data that cause the user device to be redirected to the resource; and providing reporting data to each of the one or more other data processing apparatus, the reporting data specifying that the user interaction with the content item occurred, wherein the reporting data is provided asynchronously relative to the redirect data. Other embodiments of this aspect include corresponding systems, apparatus, and computer programs, configured to perform the actions of the methods, encoded on computer storage devices.

These and other embodiments can each optionally include one or more of the following features. Methods can further include the actions of receiving request data that specify one or more other data processing apparatus can include receiving request data that includes a unique identifier for each of the one or more other data processing apparatus to which the user interactions are to be reported.

Receiving request data that includes a unique identifier can include receiving request data that includes a unique identifier that uniquely identifies a specific user device that was used to interact with the content item.

Providing response data can further include providing response data in which the unique identifier is included in a uniform resource locator (URL).

Providing reporting data can include providing reporting data that include the unique identifier for each of the one or more other data processing apparatus to which the user interactions are to be reported.

Methods can further include the actions of providing reporting data comprises providing reporting data that include an encrypted shared unique identifier.

Methods can include the actions of receiving request data indicating that a user device has requested a content item, providing response data in response to the request data, the response data including a location from which the user device can receive the content item, the content item including a reference to a resource that is requested in response to user interaction with the content item; receiving interaction data specifying that user interaction with the content item occurred, the interaction data specifying one or more other data processing apparatus to which user interactions with the content item are to be reported; providing redirect data that cause the user device to be redirected to the resource; and providing reporting data to each of the one or more other data processing apparatus, the reporting data specifying that the user interaction with the content item occurred, wherein the reporting data is provided asynchronously relative to the redirect data.

Methods can include the actions of receiving a content item request that was initiated by a user device, the content item request indicating that a content item has been requested for presentation at the user device; generating a unique identifier in response to receiving the request; providing content item location data to the user device, the content item location data including the unique identifier and data specifying a network location of a different data processing apparatus from which the content item that is responsive to the content item request is obtainable; receiving, from the different data processing apparatus, reporting data specifying that user interaction with the content item occurred, the reporting data including the unique identifier; and logging data specifying that the user interaction with the content item occurred.

Providing content item location data can further include providing content item location data in which the unique identifier is included in a uniform resource locator (URL) for the content item that is responsive to the content item request.

Providing content item location data that includes the unique identifier can include providing content item location data that includes a unique identifier that uniquely identifies a specific user device to which the content item location data was provided.

Particular embodiments of the subject matter described in this specification can be implemented so as to realize one or more of the following advantages. As the number of redirects that are performed prior to providing a resource to a user device is reduced, the likelihood that the resource will be successfully provided to the user device increases. As the number of redirects that are performed prior to providing a resource to the user device are reduced, the latency between the request for the resource and the resource being provided to the user device decreases.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
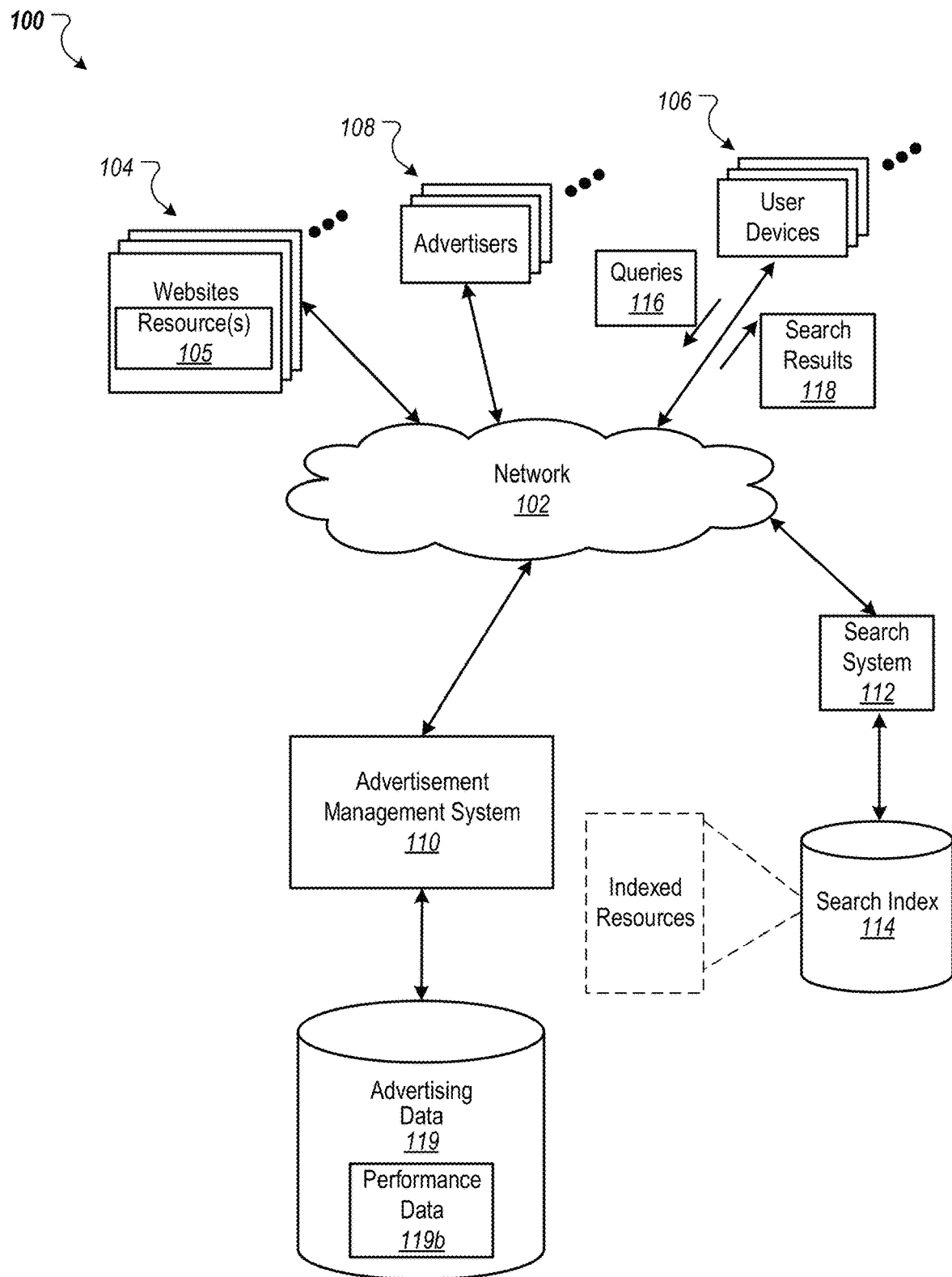
FIG. 1 is a block diagram of an example environment in which online content is distributed to user devices

Resources available over the internet can include content from publishers as well as content from advertisers. For example, a web page can include publisher content from a publisher, along with advertisements (ads) on the web page. The publisher content can be provided by publisher servers and the ads by advertisement servers. The publisher servers and advertisement servers can be different server systems. Thus, when a web page is presented at a user device, the web page can include content that was provided by multiple different parties.

Providing, or serving, the ads that are presented with the web page can also include coordination between multiple parties. For example, the ads that are selected for presentation with the web page can be selected by an ad server ("publisher ad server") that the publisher has requested to select the ads. The advertisements that are selected by the publisher ad server may be hosted, for example, by another ad server ("advertiser ad server") that manages distribution of the advertisement for the advertiser. Because the advertiser pays for distribution of the advertisement, and the publisher is compensated for having the advertisements presented with its content, each of the publisher ad server and advertiser ad server may track user interactions with the advertisements. Further, an advertiser (or a publisher) may have opted-in to an advertisement analytics service that collects user interaction data and analyzes the user interaction data to provide the advertiser with information about the performance of the advertisements. Thus, additional servers may also be tracking user interactions with a particular advertisement.

To facilitate tracking of user interactions by multiple different servers (or other data processing apparatus), in response to a user interaction with an advertisement, the user device from which the user interaction was initiated can be redirected to each of the servers that is tracking the user interactions so that each server can log the user interaction. However, as the number of redirects increases, the latency between the user interaction and presentation of a requested resource increases. Additionally, each additional redirect that a user device performs increases the likelihood that a communication error (or another error) will prevent the requested resource from being provided to the user device. Increased latency can also result in users interrupting the communication chain, for example, if the user thinks the resource is not loading correctly or if the user decides to navigate to a different website instead of waiting for the resource.

In some implementations, the number of redirects that a user device performs can be reduced by having one (or more) of the servers contact each (or a proper subset) of the other servers with information about the user interaction. For example, as described in more detail below, each server that is tracking user interactions for a content item provides a unique identifier with which user interaction with a particular advertisement can be identified. When the user interacts with the particular advertisement, one of the servers (e.g., the ad server that provided the content of the advertisement to the user device) can redirect the user device to a web page to which the advertisement references (e.g., links), and asynchronously provide each of the other servers their respective unique identifiers. In turn, each of the servers can use the unique identifiers that they provided to determine the advertisement that was interacted with, and which user device was used to interact with the advertisement. Thus, the user device need not be redirected to each of the different servers.

In some implementations, each ad instance may be assigned a unique identifier, with a different unique identifier for each particular ad used for each user to whom the ad is presented. In some implementations, each user may be assigned a unique identifier, with the same unique identifier used for each ad presented to the user. In some implementations, the unique identifier can include a portion that is unique for each user, combined with a portion that is random.

The description that follows discusses tracking user interactions with advertisements. However, user interactions with other types of content items (e.g., audio files and video files) can also be tracked in a manner similar to that described. Additionally, the terms "ad server" and "server" are used to refer to data processing apparatus with which user interaction tracking can be performed, but other data processing apparatus can also be used.

FIG. 1 is a block diagram of an example environment 100 in which online content is distributed to user devices. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example web site is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can request resources 105 from a website 104. In turn, data representing the resource 105 can be provided to the user device 106 for presentation of the resource 105 by the user device 106. The data representing the resource 105 can also include data specifying a portion of the resource or a portion of a user display (e.g., a presentation location of a pop-up window or in a slot of a web page) in which advertisements can be presented. These specified portions of the resource or user display are referred to as advertisement slots.

To facilitate searching of these resources 105, the environment 100 can include a search system 112 that identifies the resources 105 by crawling and indexing the resources 105 provided by the publishers on the websites 104. Data about the resources can be indexed based on the resource 105 to which the data corresponds. The indexed and, optionally, cached copies of the resources 105 are stored in a search index 114.

User devices 106 can submit search queries 116 to the search system 112 over the network 102. In response, the search system 112 accesses the search index 114 to identify resources that are relevant to the search query 116. The search system 112 identifies the resources in the form of search results 118 and returns the search results 118 to the user devices 106 in search results pages (i.e., resources in which search results are presented). A search result 118 is data generated by the search system 112 that identifies a resource that is responsive to a particular search query, and includes a link to the resource. An example search result 118 can include a web page title, a snippet of text or a portion of an image extracted from the web page, and the Uniform Resource Locator ("URL") of the web page. Search results pages can also include one or more advertisement slots in which advertisements can be presented.

When a resource 105 or search results 118 are requested by a user device 106, the advertisement management system 110 receives a request for advertisements to be provided with the resource 105 or search results 118. The advertisement management system 110 is a data processing apparatus that selects advertisements (or other content items) that are responsive to an advertisement request (or other content item request). For example, the advertisement management system 110 can include one or more ad servers that can select and or distribute advertisements that are responsive to an advertisement request.

To facilitate selection of a responsive advertisement, the request for advertisements can include characteristics of the advertisement slots that are defined for the requested resource or search results page, and can be provided to the advertisement management system 110. For example, a reference (e.g., URL) to the resource for which the advertisement slot is defined, a size of the advertisement slot, and/or media types that are eligible for presentation in the advertisement slot can be provided to the advertisement management system 110. Similarly, keywords associated with a requested resource ("resource keywords") or a search query 116 for which search results are requested can also be provided to the advertisement management system 110 to facilitate identification of advertisements that are relevant to the resource or search query 116.

Based on data included in the request for advertisements, the advertisement management system 110 selects advertisements that are eligible to be provided in response to the request ("eligible advertisements"). For example, eligible advertisements can include advertisements having characteristics (e.g., size and/or aspect ratio) matching the characteristics of advertisement slots and that are identified as relevant to specified resource keywords or search queries 116.

Data representing conditions under which advertisements were selected for presentation to a user, and user interaction data (e.g., Id1 . . . Idn) representing actions taken by users in response to presentation of the advertisement (e.g., Ad1 . . . Adi) can be stored in a data store such as performance data store 119b.

For example, the performance data store 119b can store data specifying targeting keywords that caused presentation of the advertisement (e.g., that matched a resource keyword or search query), resource keywords and/or search queries that matched the targeting keywords, ad slots in which the advertisement appeared, characteristics (e.g., locations and sizes) of the ad slots, and any special characteristics that might have been applied to the advertisement. Example characteristics that can be applied to an advertisement include the advertisement being presented with an image, the advertisement being presented with (e.g., adjacent to) multiple links (e.g., hypertext links) to different landing pages for the advertiser, or the advertisement being provided with a link that, in response to selection of the link, causes the advertisement to expand and revealing additional information associated with the advertisement (e.g., revealing a map, presenting a video clip, or providing product purchasing information).

The performance data store 119b can also store user interaction data specifying user interactions with presented advertisements (or other content items). For example, when an advertisement is presented to the user, data can be stored in the performance data store 119b representing the advertisement impression. When a user selects (i.e., clicks) a presented advertisement, selection data is stored in the performance data store 119b representing the user selection of the advertisement.

As described in more detail with reference to FIG. 2B, the selection data is stored in response to a request for a web page that is linked to by the advertisement. For example, the user selection of the advertisement can initiate a request for presentation of a web page that is provided by (or for) the advertiser ("the advertiser's web page"). However, prior to the request for the advertiser's web page being submitted to a server that hosts the advertiser's web page, the request may be redirected through the advertisement management system so that the request can be logged. The request can include data identifying a cookie for the user device, and the advertisement management system 110 can store data from the cookie in the performance data store 119b. A cookie can be data provided by a server and/or stored on the user device. The server can obtain the cookie from the user device when the user device communicates with the server.

For situations in which the systems discussed within this document collect personal information about users, the users may be provided with an opportunity to opt in/out of programs or features that may collect personal information (e.g., information about a user's demographics, past advertisement selection). In addition, user data may be anonymized in one or more ways before it is stored or used, so that personally identifiable information is removed. For example, a user's identity may be anonymized and/or encrypted so that the no personally identifiable information can be determined for the user, or a user's activities may be generalized (e.g., to a large group of users) where user activity information is obtained.

As described in more detail below, when multiple different entities and/or systems track user interactions with content items (e.g., advertisements), multiple redirects may be performed prior to a resource being requested from a server that provides the resource. Thus, the latency between user interaction with a content item and receipt, by the user device, of a resource that is associated with the content item may increase in proportion to the number of redirects that occur. Additionally, the likelihood of a network error (or another error, such as a processing error) occurring increases with each redirect that occurs, such that the reliability with which resources are provided to a user device decreases in proportion to the number of redirects that occur prior to providing the resource to the user device.

The serving of content items and using multiple redirects to track user interactions with the content items are described in more detail with reference to FIGS. 2A and 2B. An example data flow for reducing the number of redirects that are used to track user interactions is described with reference to FIG. 3, and example processes for tracking user interactions using the reduced number of redirects are described with reference to FIGS. 4 and 5.

Figure 2A:
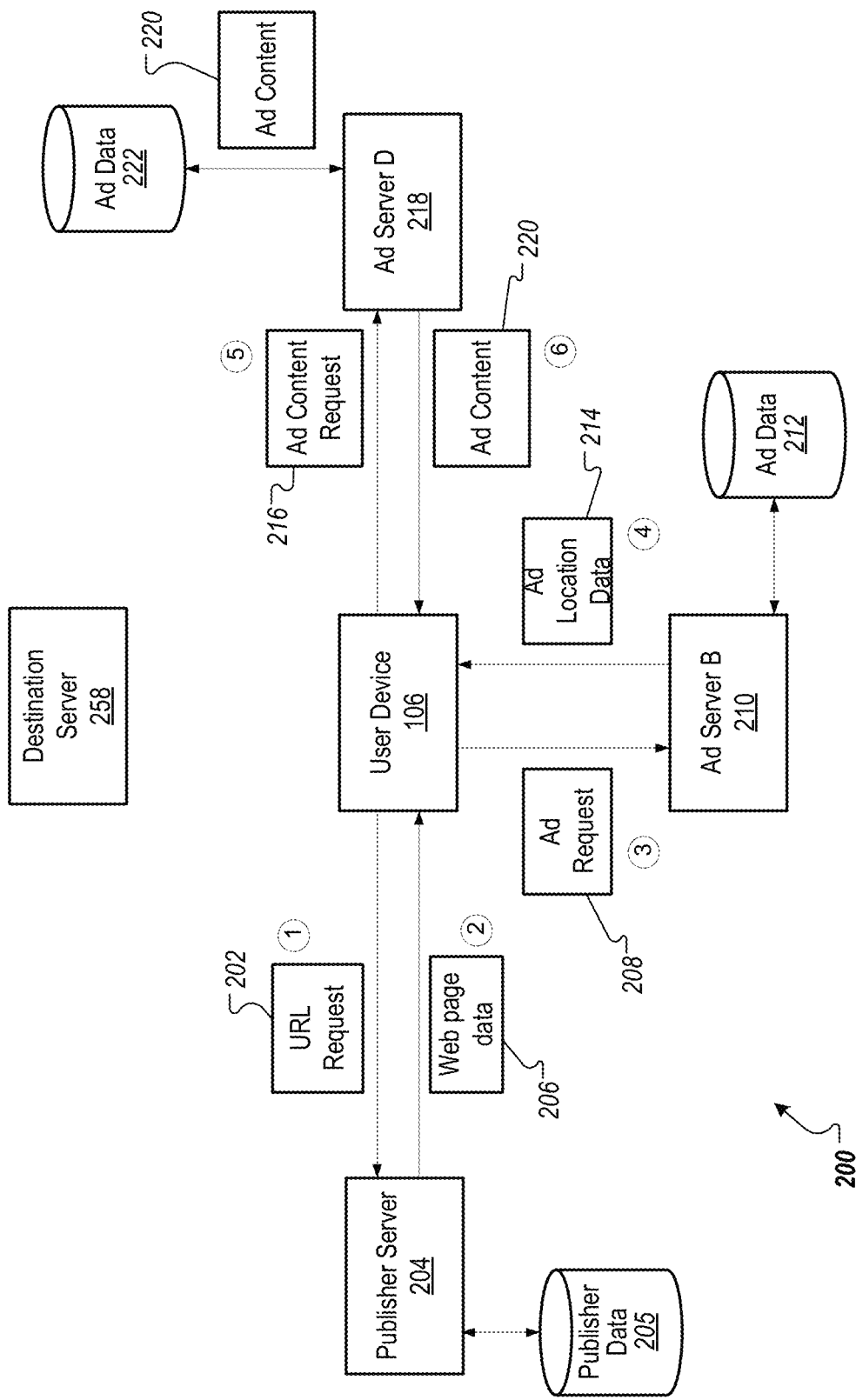
FIG. 2A is a block diagram of an example data flow for providing a content item with a resource, and tracking user interactions with the content item.

FIG. 2A is a block diagram of an example data flow 200 for providing a content item with a resource, and tracking user interactions with the content item. The data flow 200 begins with submission of a URL request 202 by a user device 106. In response to the request, a publisher server 204 (e.g., a server that provides publisher resources in response to a request) can provide web page data 206 to the user device 106. The web page data 206 include data that represent (and cause presentation of) a web page and a portion of code that upon execution causes the user device 106 to submit an ad request 208 (e.g., a request for selection of an advertisement to be presented with a resource) to ad server B 210 (e.g., a server that selects an advertisement for presentation with the web page that is represented by the web page data 206). Ad server B 210 can be an ad server (or another data processing apparatus) that is included in, or implemented independent of, the advertisement management system 110 of FIG. 1.

As described above with reference to FIG. 1, the ad server B 210 uses information included in the ad request 208 to select an ad that will be provided with the web page (i.e., the web page that is represented by the web page data 206). For example, the ad server B 210 can use psychographic, demographic, or other information about a user (or a group of users with which the user is associated) in order to select the ad. In some implementations, the ad server B 210 can access an advertisement data store 212 to select an ad having targeting criteria that match the information included in the ad request 208. In turn, the ad server B 210 can provide ad location data 214 to the user device 106.

The ad location data 214 are data that specify a location (e.g., a URL or another network location) from which the user device 106 can obtain the selected ad. For example, the ad location data 214 can cause the user device 106 to request content of selected ad ("ad content") from another server, such as an advertiser's ad server D 216. In some implementations, the ad location data 214 cause the user device 106 to send an ad content request 216 (also referred to as "request data") to ad server D 218. The ad content request 216 can identify, for example, the selected ad that is being requested. For example, the ad content request 216 can include an identifier that uniquely identifies the selected ad. Ad server D 218 can be an ad server (or another data processing apparatus) that is included in, or implemented independent of, the advertisement management system 110 of FIG. 1.

In some implementations, the ad location data 214 that are provided by the ad server B 210 include interaction tracking data (i.e., a portion of code with which user interactions are tracked) that are used by the ad server B 210 to track user interactions with the selected ad. For example, the ad server B 210 may include in the ad location data 214 a portion of code that, in response to user interaction with the selected advertisement, causes the user device 106 to be redirected to the ad server B 210 prior to requesting a resource to which the selected advertisement links (e.g., a resource to which the advertiser of the advertisement has linked the advertisement). The interaction tracking data for ad server B 210 can also be included in the ad content request 216 and/or, as described below, included with ad content for the selected ad that is provided by ad server D 218 (or another ad server).

In response to receiving the ad content request 216, ad server D 218 locates the ad content 220 for the selected ad. For example, the ad server D 218 can access or query an ad content data store 222 to obtain the ad content 220 using the identifier that was included in the ad content request 216. In turn, the ad server D 218 provides the ad content 220 to the user device 106. The ad content 220 that is provided to the user device 106 can include a portion of code that, in response to user interaction with the advertisement, causes the user device 106 to submit a request for a resource with which the advertisement is associated (e.g., a web page for the advertiser or another resource that is referenced by the ad content 220). For example, the ad content 220 can specify a URL of a web page for the advertiser that provided the selected advertisement, such that in response to user interaction with the selected advertisement, a request for the web page is initiated, as described in more detail below.

In some implementations, the ad server D 218 includes with the ad content 220 interaction tracking data that are used by the ad server D 218 to track user interactions with the selected ad. For example, the ad server D 218 may include in the ad content 220 a portion of code that, in response to user interaction with the selected advertisement, causes the user device 106 to be redirected to the ad server D 218. The ad server D 218 can also include with the ad content 220, the interaction tracking data for the ad server B 210. Thus, the ad content 220 that is provided to the user device 106 can include interaction tracking data for both ad server B 210 and ad server D 218, such that in response to user interaction with the selected advertisement, the user device 106 is redirected to ad server D 218 and ad server B 210 prior to being directed to a publisher server (or another server) from which the resource to which the selected advertisement links can be obtained, as described in more detail below.

Figure 2B:
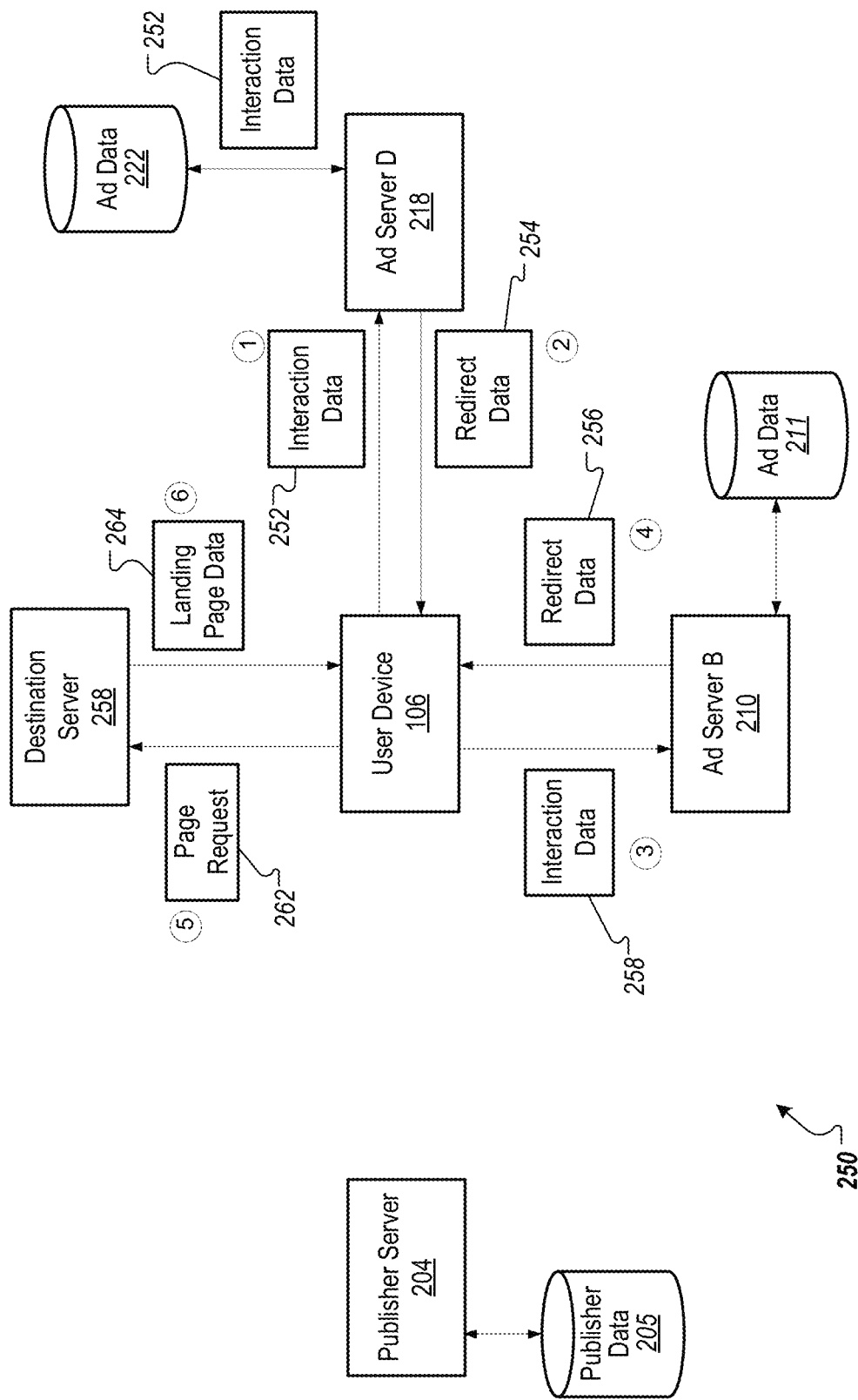
FIG. 2B is a block diagram of an example data flow for tracking user interactions using multiple redirects.

FIG. 2B is a block diagram of an example data flow 250 for tracking user interactions (e.g., user clicks of an ad) using multiple redirects. The data flow 250 begins with submission, by the user device 106, of interaction data 252 to ad server D 218 when a user clicks on the selected ad. The submission of the interaction data 252 to the ad server D 218 can be caused, for example, by the interaction tracking data that the ad server D 218 included in the ad content 220 that was provided to the user device.

Interaction data 252 are data that specify that user interaction with the selected advertisement (or another content item) has occurred. The interaction data 252 can include a resource request that specifies a URL of the requested resource. The interaction data 252 can also include interaction tracking data for one or more different servers that track user interactions with the selected advertisement.

The interaction data 252 provide information to ad server D 218, including information such as a time of interaction and information relating to the user device 106, such as the cookie on the user device 106. The ad server D 218 can store the interaction data 252 in the ad data store 222 and provide redirect data 254 (e.g., a Hypertext Transfer Protocol (HTTP) 302 status code) to the user device 106.

The redirect data 254 can direct the user device 106 to ad server B 210, for example, based on the interaction tracking data that was included in (or provided with) the ad location data 214. The user device 106 provides the interaction data 252 (or other data) to the ad server B 210, such that ad server B 210 is informed of the user interaction with the selected ad. The ad server B 210 logs the user interaction with the selected ad. For example, ad server B 210 can store the interaction data 252 and/or information about the user device 106 in a data store, such as the ad data store 212. In turn, ad server B 210 can provide redirect data 256 to the user device 106.

The redirect data 256 can direct the user device 106 to a destination server 258, which can provide, to the user device 106, the resource that is associated with the ad (e.g., the web page to which the advertiser linked the advertisement). Alternatively, the redirect data 256 may redirect the user device 106 to additional servers (e.g., additional servers that track user interactions with the selected ad) prior to user device 106 being redirected to the destination server 258. In response to being redirected to the destination server 258, the user device can submit the interaction data 252 (or a portion thereof) to the destination server 258.

When advertisement tracking is performed according to the data flow 250, the user device 106 may go through multiple redirects before reaching the landing page associated with the selected ad. The number and order of redirects can be different from the number and order of redirects shown in this example process. However, multiple redirects for the user device 106 can increase latency, requiring the user to wait longer to see a landing page, as well as increase the chances of a break in the chain of redirects, either by a drop in the communication between devices on the network, or by incorrect or outdated destination location links.

Figure 3:
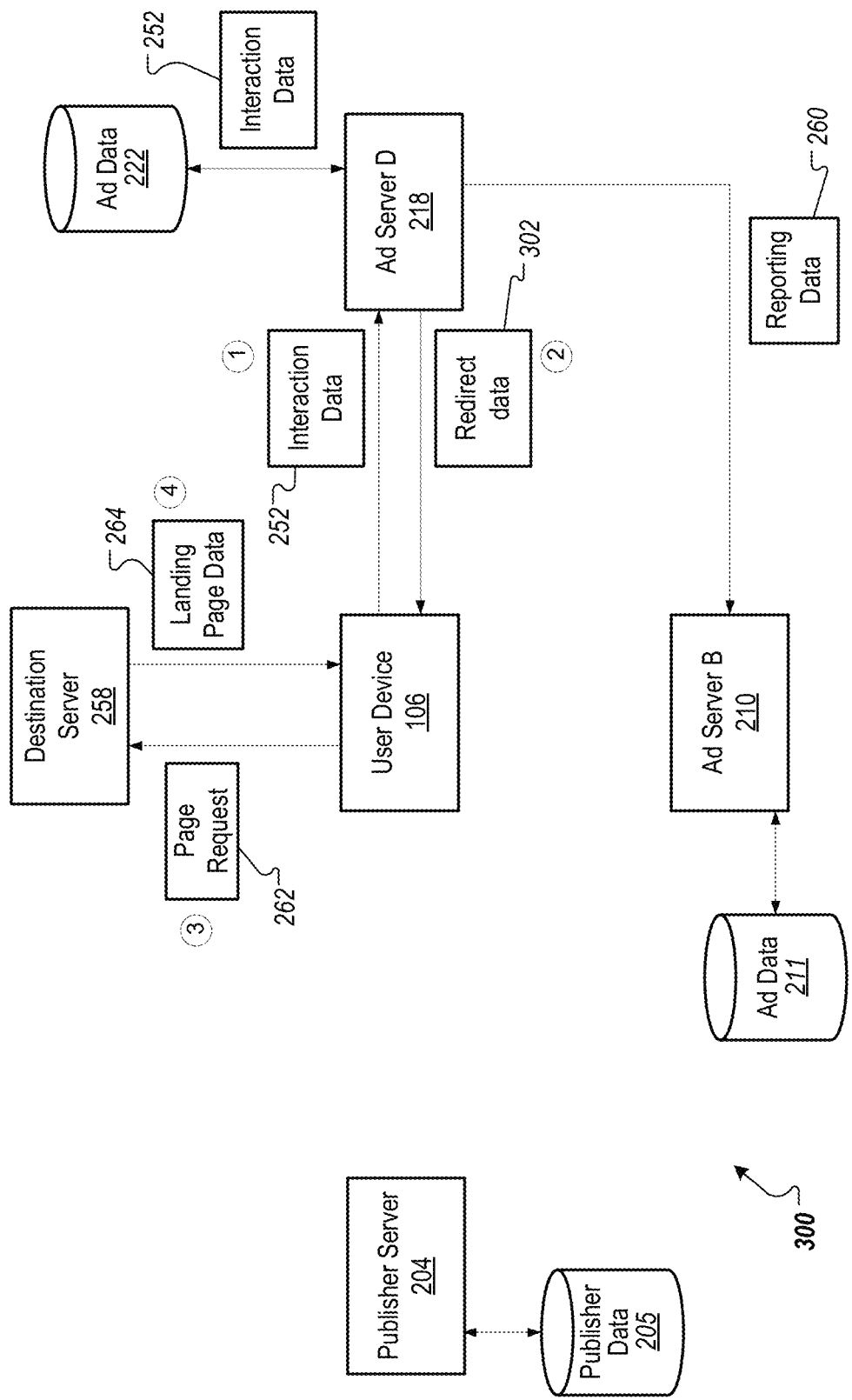
FIG. 3 a block diagram of an example data flow for reducing the number of redirects performed to track user interactions with content items.

FIG. 3 is a block diagram of an example data flow 300 for reducing the number of redirects used to track user interactions with content items. The data flow 300 begins with the user device 106 submitting interaction data 252 to ad server D 218 in response to a user interaction with a selected advertisement. In response to receiving the interaction data 252, the ad server D 218 (e.g., the first ad server to receive the interaction data 252 and/or the ad server from which the user device received the ad content) sends redirect data 302 to the user device 106. The redirect data 302 directs the user device 106 to the destination server 258 to request the web page that is associated with the selected advertisement. Irrespective of whether other ad servers (or other data processing apparatus) are tracking user interactions with the selected advertisement, the redirect data 302 does not require the user device to be redirected through the other ad servers (e.g., ad server B 210) prior to requesting the web page. Thus, a user device 106 can be provided with the requested web page after only a single redirect.

The interaction data 252 are logged, for example, in the ad data store 222. In turn, ad server D 218 asynchronously provides reporting data 260 to ad server B 210 (and/or any other ad servers or other data processing apparatus that are tracking user interactions with the selected advertisement). As described in more detail below, the reporting data 260 are data that communicate the user interaction to other data processing apparatus. Thus, ad server B 210 can also log the interaction with the selected advertisement by the user device 106.

Ad server D 218 can identify the user device 106 to ad server B 210 by using a unique and/or encrypted identifier that is associated with the selected ad. The unique identifier can be, for example, an identifier that was provided by the ad server B 210 when the selected advertisement was requested. For example, ad server B 210 can provide the unique identifier to ad server D 218 when providing the ad location data to the user device 106, such as through a reserved key-value pair that is included in the URL of the ad content request. The reserved key-value pair can be for example, a combination of a key that identifies ad server B 210 and a value that specifies the unique id that ad server B 210 generated for the current ad request, as described in more detail below. In turn, the ad server D 218 can identify this reserved key-value pair in the URL, and report user interactions to the ad server B 210 based on the inclusion of the reserved key-value pair in the URL.

In some implementations, ad server B 210 generates a different unique identifier for each selected ad (e.g., on a per-ad-request and/or per-user basis), such that each selected ad and each request for which the selected ad was selected is identifiable based on the unique identifier. Thus, when a user interacts with an ad, and ad server D 218 provides ad server B 210 with the unique identifier associated with the ad, ad server B can identify which ad was clicked on, which request the ad was selected for, and therefore, which user interacted the ad. Thus, no user identifying information need be included in the unique identifiers that are generated by the ad server B 210.

Alternatively or additionally, the ad server B 210 and ad server D 218 use a cookie exchange system to track user interactions with advertisements (or other content items) while still requiring fewer (e.g., only one) redirect. For example, a database of shared unique identifiers (e.g., anonymous and encrypted identifiers) can be established to facilitate user interaction tracking. The database of shared unique identifiers enables each server to match the shared unique identifiers to server specific user identifiers that were created by the server, such that when a particular ad server receives a shared unique identifier from another ad server, the particular ad server can identify the server specific user identifier that the particular ad server has created for the user device. In some implementations, the shared unique identifiers can be a hashed cookie identifier (e.g., a hashed user-specific identifier) for a cookie and/or an encrypted form of the cookie, and the encryption key is kept secret.

To illustrate the use of the cookie exchange system, assume that ad server D 218 receives interaction data that include a server specific cookie that was previously generated by ad server D 218. In this example, ad server D 218 can provide to ad server B 210 the interaction data and the shared unique identifier (e.g., an encrypted cookie) to inform ad server B 210 of the user interaction with the selected ad. Thus, ad server D 218 does not need to provide ad server B 210 with any of the information that was included in the server specific cookie, thereby protecting user privacy.

In some implementations, the ad server B 210 can provide to ad server D 218 an encrypted form of the cookie (or a proper subset of information provided by the cookie). The encrypted form of the cookie can function as an identifier, but ad server D 218 and ad server B 210 do not need to store the identifier. Rather, ad server D 218 can provide the encrypted form of the cookie to ad server B 210 when the user interaction with the selected ad occurs. Ad server B 210 can receive and decrypt the encrypted form of the cookie to retrieve the cookie itself. Ad server B 210 can then use the cookie to log interaction data with the user.

In some implementations, the interactions between the user device 106, ad server B 210 and ad server D 218 can occur in a different order than the example interaction described in FIG. 2A. For example, the user device 106 can be directed by the publisher server 204 to ad server D 218 for an ad request. Ad server D 218 can provide a response, such as ad location data, that directs the user device 106 to ad server B 210 to receive the ad content. In such implementations, when the user interacts with the selected ad, the user device 106 can then provide to ad server D 218 the unique identifier that directs ad server D 218 to provide interaction data asynchronously to ad server B 210.

In some implementations, multiple ad servers can be involved in a chain of interactions for serving of the ad. The chain of interactions can include ad servers both before and after an ad server that provides interaction data asynchronously to the other ad servers upon user interaction with a selected ad.

Figure 4:
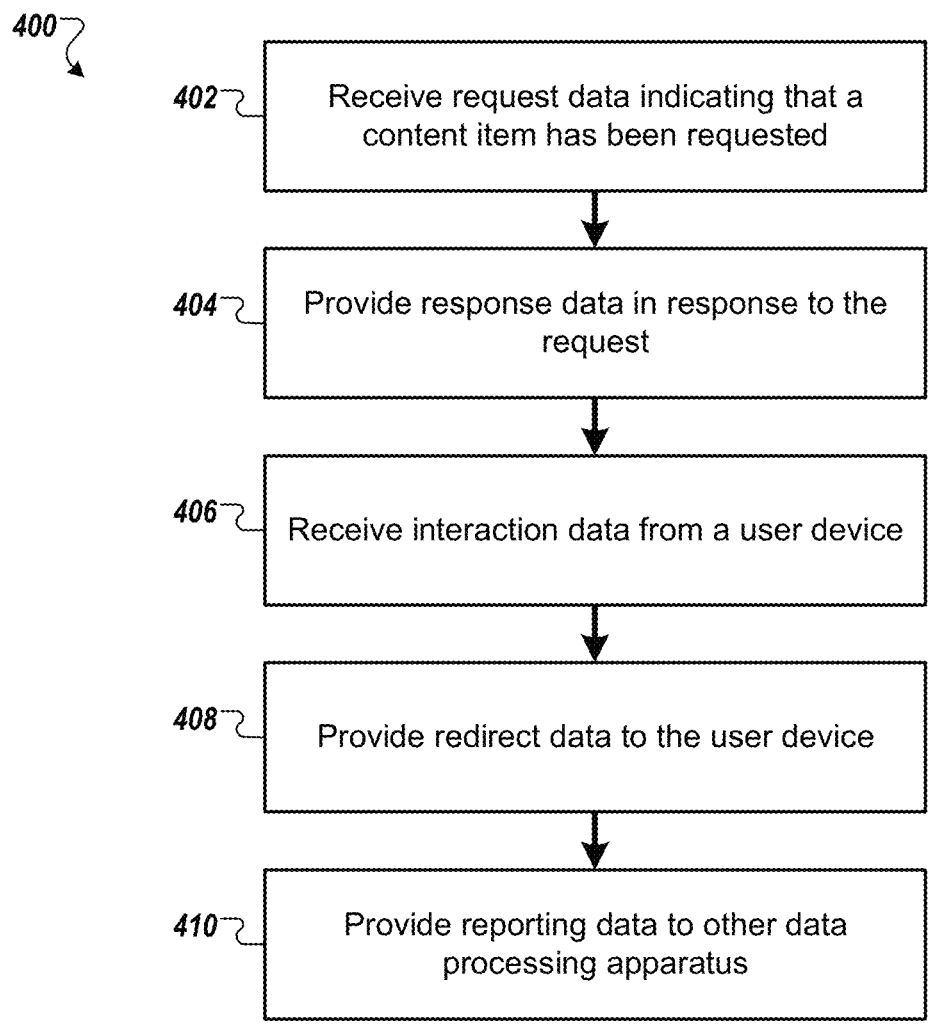
FIG. 4 is a flow chart of an example process for tracking user interactions using a single redirect.

In some implementations, each ad instance may be assigned a unique identifier, with a different unique identifier for any particular ad used for each user to whom the ad is presented. In some implementations, each user may be assigned a unique identifier, with the same unique identifier used for each ad presented to the user. FIG. 4 is a flow chart of an example process 400 for tracking user interactions using a single redirect. The process 400 can be implemented, for example, by the advertisement management system 110 of FIG. 1, and/or the ad server D 218 of FIGS. 2A and 2B. In some implementations, the advertisement management system 110 and/or the ad server D 218 are each data processing apparatus that include one or more processors that are configured to perform actions of the process 400. In some implementations, a computer readable medium can include instructions that when executed by a computer cause the computer to perform actions of the process 400.

Request data indicating that a content item has been requested are received (402). In some implementations, the request data specify one or more other data processing apparatus (e.g., server systems) to which user interactions with the content item are to be reported. For example, with reference to FIG. 3, the request data can be received by the ad server D 218, and can include data specifying that user interactions with an advertisement is to be reported to ad server B 210.

The data specifying the one or more other data processing apparatus to which the user interactions are to be reported can specify a unique identifier for each data processing apparatus to which the user interactions are to be reported. For example, each data processing apparatus to which user interaction information is to be provided can generate a unique identifier for each content item request, and the unique identifier can be included in the request data that are received from a user device. As described above, unique identifiers can also be generated on a per-user device basis. Thus, a reference to the unique identifier can indicate to each the data processing apparatus which user device was used to interact with the content item and/or which content request resulted in the user interaction. In some implementations, each unique identifier can be included in a URL of the content item, such as in a reserved key-value pair, as described with reference to FIG. 3.

The requested content item includes a reference to a resource that is requested in response to user interaction with the content item. In some implementations, the resource is a landing page (e.g., a web page) that is requested by a user device following user interaction with the content item (e.g., an advertisement). The landing page can be, for example, a web page that provides further information about a product or service that is being advertised by the content item.

Response data are provided in response to the request data (404). In some implementations, the response data include data that cause presentation of the content item at a user device. For example, the response data can include data that cause presentation of an advertisement in an advertisement slot that has been defined in a web page. The system provides the response data to the user device so the content item is presented with the web page.

The response data can also include a URL (or another active link) that is used to request the resource in response to user interaction with the content item. For example, the URL can include the location from which the resource can be obtained. Additionally, the URL can include key-value pairs that identify each of the data processing apparatus to which user interaction with the content item is to be reported, and unique identifiers with which the data processing apparatus can identify the content item with which a user interacted, and the user device from which the content item was interacted. For example, the URL www.example-.com/click?redir=example.org&notify=adserv_B:12345,adserv_C:56455, can include the location from which a web page can be obtained (e.g., www.example.org), as well as two ad servers (e.g., adserv_B and adserv_C) to which user interaction with the content item are to be reported. The example URL also includes unique identifiers (e.g., 12345 and 56455) with which the respective ad servers can identify the content item with which a user interacted, and the user device from which the content item was interacted.

Interaction data are received (406). The interaction data specify that user interaction with the content item has occurred. For example, in response to user interaction with the content item, the user device can submit a request for the resource to which the content item is linked. The request can include the interaction data and information that is stored at the user device, such as a cookie. The received interaction data can be logged, as described above.

Redirect data are provided to the user device (408). The redirect data cause the user device to be redirected to the resource to which the content item is linked (e.g., the resource that is located at the URL that the advertiser associated with content item). In some implementations, the redirect data cause the user device to request the resource without further redirects. In some implementations, the redirect data cause the user device to be redirected to fewer than a total number of data processing apparatus that are tracking user interactions with the content item.

For example, with reference to FIG. 3, assume that ad server B 210 and ad server D 218 are both tracking user interactions with the content item. Further assume that a third server (e.g., an advertising analytics server) is also tracking user interactions with the content item. In this example, when ad server D 218 receives the interaction data, the ad server D 218 can provide redirect data that cause the user device 106 to request the resource without any further redirects, or with only one additional redirect. Thus, the redirect data can prevent the user device from being redirected to each of the servers that are tracking user interactions with the content item. Accordingly, the latency between the user interaction and the resource being provided to the user device will be reduced, as redirects to at least some of the servers are skipped.

Reporting data are provided to other data processing apparatus (410). The reporting data can be provided asynchronously (relative to the redirect data), such that the user device can request the resource independent of the reporting data being provided to the other data processing apparatus. In some implementations, the reporting data are provided to the other data processing apparatus (e.g., other servers, such as ad servers) that would have received interaction data through a series of sequential redirects, as described with reference to FIG. 2B.

The reporting data can include data that specify that user interaction with the content item occurred. For example, the reporting data can include the interaction data and/or unique identifiers that have been provided by various data processing apparatus in order to specify the content item with which the user interaction occurred and/or the user device from which the user interaction occurred. As described above, the unique identifiers can be generated such that user privacy is protected. The system can provide interaction data to each data processing apparatus that has provided a unique identifier for the content item with which the user interacted. In some implementations, an encrypted shared identifier can be provided to each of the other data processing apparatus that have been identified as tracking user interactions with the content item. For example, as described above, a cookie exchange system can be used in order to securely communicate to other data processing apparatus the user interaction with the content item without making available, to the other data processing apparatus, other user data that may be included in a cookie.

Figure 5:
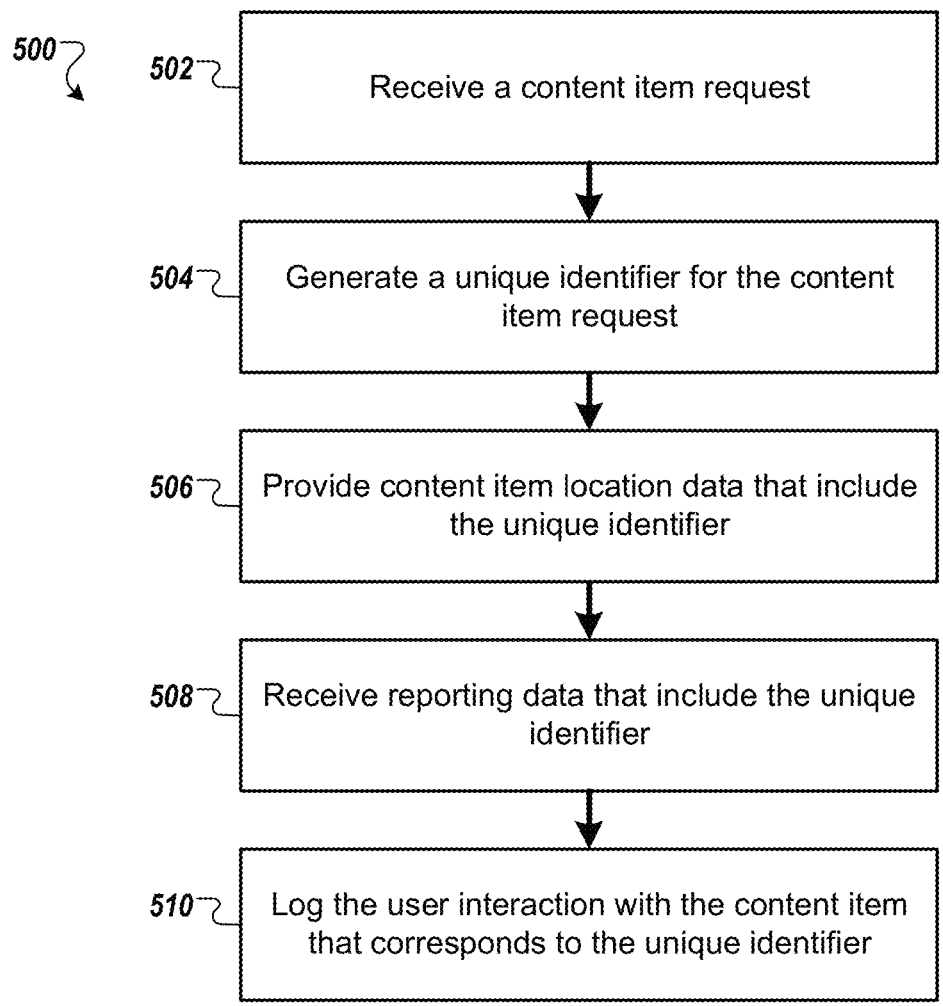
FIG. 5 is a flowchart of an example process for tracking user interactions with content items.

FIG. 5 is a flowchart of an example process 500 for tracking user interactions with content items. The process 500 facilitates tracking the user interactions without requiring a user device to be redirected to the data processing apparatus that is performing the tracking. The process 500 also facilitates tracking the user interactions without requiring the data processing apparatus from placing a cookie on the user device.

The process 500 can be implemented, for example, by the advertisement management system 110 of FIG. 1, and/or the ad server B 210 of FIGS. 2A and 2B. In some implementations, the advertisement management system 110 and/or the ad server B 210 are each data processing apparatus that include one or more processors that are configured to perform actions of the process 500. In some implementations, a computer readable medium can include instructions that when executed by a computer cause the computer to perform actions of the process 500.

A content item request is received (502). The content item request is a request for a content item to be selected for presentation with a resource that has been requested by a user device. For example, as described above with reference to FIG. 2A, when a user device requests presentation of a web page, an ad request can be submitted to an advertisement server (e.g., as server B 210). The ad request is a request for selection of an advertisement to be provided in an advertisement slot.

The content item request specifies one or more features of a resource with which the requested content item will be presented. For example, the content item request can include information about the web page on which the content item is to be displayed and/or keywords that have been identified as relevant to the content of the web page. The request data can also include information about the user device (e.g., a unique identifier that identifies the user device) and/or the user, such as demographic information, including gender, age range, interests, geographic location and other information. As described above, the user information can be anonymized and/or encrypted in order to protect user privacy.

A unique identifier is generated in response to the content item request (504). In some implementations, the unique identifier can be a semi-randomly selected sequence of numbers and/or letters or another unique character string that uniquely identify the content item request. For example, the unique identifier could be a hash of the unique identifier for the user device and/or a hash of the time at which the content item request was received. A different unique identifier can be generated for each content item request, such that each content item request, and in turn, data associated with the content item request (e.g., unique identifier for the user device that submitted the content item request and the content item that was selected in response to the request) can be identified using the unique identifier.

Ad location data are provided in response to the content item request (506). As described above, the ad location data specify a location (e.g., a URL) of a content item that was selected ("the selected content item") based on the content item request. In some implementations, the ad location data also includes the unique identifier that was generated, so that user interaction with the selected content item can be tracked using the unique identifier. For example, as described above, the unique identifier can be appended to (or otherwise included in) the URL for the selected content item. The ad location data can be provided to the user device from which the content item request was received.

Reporting data that include the unique identifier are received (508). The reporting data can be received, for example, from a data processing apparatus that is different from the user device from which interaction with the content item occurred. In some implementations, the reporting data can be received from the server system that provides the data to the user device that cause presentation of the selected content item at the user device. For example, with reference to FIG. 2A, the reporting data can be received from ad server D 218 that provided the ad content 220 to the user device. The reporting data can include the interaction data that are received from the user device. Alternatively, the reporting data can include only one or more unique identifiers that were provided by the data processing apparatus that are tracking user interactions with the content item.

In some implementations, the reporting data can include a shared identifier (e.g., an encrypted identifier) for the user device from which user interaction with the content item occurred and/or data specifying the content item with which user interaction occurred. The shared identifier can be mapped to a server-specific user identifier using an index of shared identifiers and server-specific user identifiers, as described above.

The user interaction with the content item is logged (510). As described above, each content item can have a corresponding unique identifier (i.e., the unique identifier that was generated in response to the content item request for which the content item was selected) that was generated in response to the request for the content item. Therefore, the reporting data can be used to identify the selected content item with which the user interacted as well as information about the user device from which the user interaction was initiated. Thus, the user interaction can be logged without redirection of the user device to each data processing apparatus that is tracking user interactions with the content item.

Figure 6:
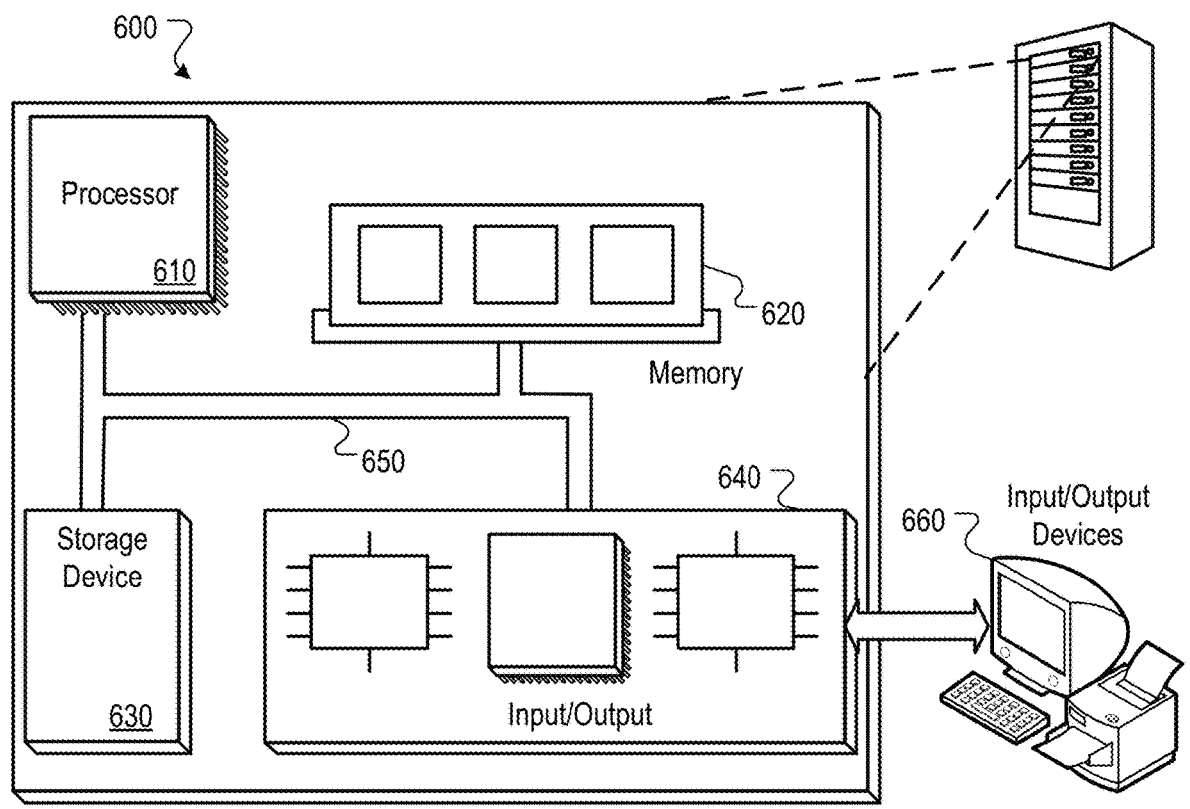
FIG. 6 is block diagram of an example computer system that can be used to track user interactions with content items.

FIG. 6 is block diagram of an example computer system 600 that can be used to track user interactions, as described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, for example, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (for example, multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, for example, an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non volatile memory, media and memory devices, including by way of example semiconductor memory devices, for example, EPROM, EEPROM, and flash memory devices; magnetic disks, for example, internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, for example, a CRT (cathode ray tube) or LCD (liquid crystal display) monitor, for displaying information to the user and a keyboard and a pointing device, for example, a mouse or a trackball, by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular implementations of particular disclosures. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
   receiving, from a remote user device and by a first tracking server that logs interactions with portions of content presented at user devices, interaction data specifying that user interaction with a given portion of content occurred, wherein the given portion of content is provided by a particular entity;
   determining, by the first tracking server and based on the interaction data, that the user interaction with the given portion of content is to be reported to multiple different tracking servers that are remote to the first tracking server, including identifying, by the first tracking sever and within the interaction data, a unique identifier corresponding to a user that performed the user interaction and information specifying the multiple different tracking servers that are to be informed, by the first tracking server, of the user interaction with the given portion of content;
   determining, by the first tracking server and based on the interaction data, a destination page that is associated with the given portion of content;
   logging, by the first tracking server and based on information in the interaction data, the interaction in association with the remote user device;
   redirecting, by the first tracking server, the user device to the destination page; and
   transmitting, to the multiple different tracking servers by the first tracking server without redirecting the user device to the multiple different tracking servers and independent of the user device, reporting data specifying one or more user identifiers corresponding to the user that performed the user interaction and also specifying an occurrence of the user interaction with the given portion of content.

2. The method of claim 1, wherein identifying the multiple different tracking servers based on the interaction data comprises identifying a server unique identifier for each of the multiple different tracking servers.

3. The method of claim 2, wherein the server unique identifier for each of the multiple different tracking servers is embedded in a URL that is included in the interaction data.

4. The method of claim 3, wherein the URL includes a network location of the destination page.

5. The method of claim 1, wherein redirecting the user device to the destination page comprises transmitting, to the user device, a redirect instruction that includes a URL of the destination page.

6. The method of claim 5, wherein transmitting reporting data specifying the occurrence of the user interaction with the given portion of content to the multiple different tracking servers comprises transmitting an encrypted shared identifier corresponding to the user device.

7. A system, comprising:
   a user device; and
      a first tracking server operated by a first entity, wherein the first tracking server logs interactions with portions of content presented at user devices, the first tracking server being operable to interact with the user device and further operable to perform operations including:
         receiving, from a remote user device, interaction data specifying that user interaction with a given portion of content occurred, wherein the given portion of content is provided by a particular entity;
         determining, based on the interaction data, that the user interaction with the given portion of content is to be reported to multiple different tracking servers that are remote to the one or more first servers;
         determining, based on the interaction data, a destination page that is associated with the given portion of content, including identifying, by the first tracking sever and within the interaction data, a unique identifier corresponding to a user that performed the user interaction and information specifying the multiple different tracking servers that are to be informed, by the first tracking server, of the user interaction with the given portion of content;
         logging, based on information in the interaction data, the interaction in association with the remote user device;
         redirecting the user device to the destination page; and
         transmitting, to the multiple different tracking servers without redirecting the user device to the multiple different tracking servers and independent of the user device, reporting data specifying one or more user identifiers corresponding to the user that performed the user interaction and also specifying an occurrence of the user interaction with the given portion of content.

8. The system of claim 7, wherein identifying the multiple different tracking servers based on the interaction data comprises identifying a server unique identifier for each of the multiple different tracking servers.

9. The system of claim 8, wherein the server unique identifier for each of the multiple different tracking servers is embedded in a URL that is included in the interaction data.

10. The system of claim 9, wherein the URL includes a network location of the destination page.

11. The system of claim 7, wherein redirecting the user device to the destination page comprises transmitting, to the user device, a redirect instruction that includes a URL of the destination page.

12. The system of claim 7, wherein transmitting reporting data specifying the occurrence of the user interaction with the given portion of content to the multiple different tracking servers comprises transmitting an encrypted shared identifier corresponding to the user device.

13. A non-transitory computer storage medium encoded with a computer program, the program comprising instructions that are executable by a first tracking server that logs interactions with portions of content presented at user devices, the first tracking server being operated by a first entity, wherein execution of the instructions by the first tracking server cause the first tracking server to perform operations comprising:
   receiving, from a remote user device, interaction data specifying that user interaction with a given portion of content occurred, wherein the given portion of content is provided by a particular entity;
   determining, based on the interaction data, that the user interaction with the given portion of content is to be reported to multiple different tracking servers that are remote to the one or more first servers;
   determining, based on the interaction data, a destination page that is associated with the given portion of content, including identifying, by the first tracking sever and within the interaction data, a unique identifier corresponding to a user that performed the user interaction and information specifying the multiple different tracking servers that are to be informed, by the first tracking server, of the user interaction with the given portion of content;
   logging, based on information in the interaction data, the interaction in association with the remote user device;
   redirecting the user device to the destination page; and
   transmitting, to the multiple different tracking servers without redirecting the user device to the multiple different tracking servers and independent of the user device, reporting data specifying one or more user identifiers corresponding to the user that performed the user interaction and also specifying an occurrence of the user interaction with the given portion of content.

14. The computer storage medium of claim 13, wherein identifying the multiple different tracking servers based on the interaction data comprises identifying a server unique identifier for each of the multiple different tracking servers.

15. The computer storage medium of claim 14, wherein the server unique identifier for each of the multiple different tracking servers is embedded in a URL that is included in the interaction data.

16. The computer storage medium of claim 15, wherein the URL includes a network location of the destination page.

17. The computer storage medium of claim 13, wherein transmitting reporting data specifying the occurrence of the user interaction with the given portion of content to the multiple different tracking servers comprises transmitting an encrypted shared identifier corresponding to the user device.

* * * * *

UNITED STATES PATENT AND TRADEMARK OFFICE
CERTIFICATE OF CORRECTION

PATENT NO. : 10,742,762 B2
APPLICATION NO. : 15/010106
DATED : August 11, 2020
INVENTOR(S) : Sze et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*